United States Patent
Jibbe et al.

(10) Patent No.: US 8,677,461 B2
(45) Date of Patent: Mar. 18, 2014

(54) METHOD TO PROVIDE CHIP BASED SECURITY FOR I/O PACKETS IN AN ARRAY USING DYNAMIC TOPOLOGY

(75) Inventors: Mahmoud K. Jibbe, Wichita, KS (US); Chandan A. Marathe, Karnataka (IN); Manjunath Balgatte Gangadharan, Karnataka (IN); Natesh Somanna, Karnataka (IN)

(73) Assignee: LSI Corporation, San Jose, CA (US)

( * ) Notice: Subject to any disclaimer, the term of this patent is extended or adjusted under 35 U.S.C. 154(b) by 244 days.

(21) Appl. No.: 13/091,381

(22) Filed: Apr. 21, 2011

(65) Prior Publication Data
US 2012/0272298 A1    Oct. 25, 2012

(51) Int. Cl.
*H04L 29/06*    (2006.01)

(52) U.S. Cl.
CPC ...................................... *H04L 63/08* (2013.01)
USPC .................... 726/5; 726/3; 713/186; 382/115

(58) Field of Classification Search
USPC ............................ 726/3, 5; 382/115; 713/186
See application file for complete search history.

(56) References Cited

U.S. PATENT DOCUMENTS

| | | | |
|---|---|---|---|
| 5,666,528 A | 9/1997 | Thai | 395/613 |
| 7,130,978 B2 * | 10/2006 | Kamano et al. | 711/163 |
| 7,203,732 B2 | 4/2007 | McCabe et al. | 709/217 |
| 7,210,084 B2 * | 4/2007 | Bunce et al. | 714/733 |
| 7,890,612 B2 | 2/2011 | Todd et al. | 709/220 |
| 7,904,732 B2 | 3/2011 | Cui et al. | 713/193 |
| 7,908,656 B1 | 3/2011 | Mu | 726/22 |
| 7,913,077 B2 | 3/2011 | Ko et al. | 713/150 |
| 7,917,598 B1 | 3/2011 | Muhlestein et al. | 709/215 |
| 2002/0124169 A1 * | 9/2002 | Agrawal et al. | 713/168 |
| 2006/0059013 A1 * | 3/2006 | Lowe | 705/2 |
| 2009/0150991 A1 * | 6/2009 | Hoey et al. | 726/18 |
| 2010/0031000 A1 * | 2/2010 | Flynn et al. | 711/216 |
| 2010/0153708 A1 * | 6/2010 | Malka | 713/155 |
| 2010/0199336 A1 * | 8/2010 | Tan | 726/6 |
| 2010/0299313 A1 | 11/2010 | Orsini et al. | 707/652 |
| 2011/0083019 A1 * | 4/2011 | Leppard et al. | 713/189 |
| 2011/0093708 A1 * | 4/2011 | Buck et al. | 713/168 |
| 2012/0117385 A1 * | 5/2012 | Bryson | 713/168 |
| 2013/0007426 A9 * | 1/2013 | Jevans | 713/1 |

* cited by examiner

*Primary Examiner* — Christopher Brown
*Assistant Examiner* — Fahimeh Mohammadi
(74) *Attorney, Agent, or Firm* — Christopher P. Maiorana, PC

(57) ABSTRACT

An apparatus comprising a controller circuit and an array. The controller circuit may be configured to read/write data in response to one or more input/output requests. The array may be configured to present/receive data to/from the controller circuit in response to the input/output requests. The data may be only transmitted to/from the array after a successful authentication between (i) a first code embedded within each of the input/output requests and (ii) a second code stored on a non-volatile memory within the controller circuit.

17 Claims, 3 Drawing Sheets

METHOD TO PROVIDE CHIP BASED SECURITY FOR I/O PACKETS IN AN ARRAY USING DYNAMIC TOPOLOGY

FIELD OF THE INVENTION

The present invention relates to data storage generally and, more particularly, to a method and/or apparatus for implementing chip based security for I/O packets in an array using dynamic topology.

BACKGROUND OF THE INVENTION

Conventional approaches provide management access to host ports in a Storage Area Network (SAN) and a Network Attached Storage (NAS) in a number of ways. One approach is to implement a password. A user is asked for a username and password with the help of a Graphical User Interface (GUI) implemented in suitable SAN management software. After entering the current credentials, the SAN components can be managed.

Password mechanisms implemented through SAN management software are subject to risks. In a case where the password is broken, or unauthorized users become aware of the password, complete access to the array is obtained. Unauthorized users would then be free to use the array at will. Such a threat continues unless the array involves an enhanced security procedure. Would-be attackers have innumerable attack vectors, methods, and tools available.

Another conventional approach implements Access Control Lists (ACLS) to allow or deny the addition of a new host to the system fabric. Access lists can allow one host the right to access a certain part of the storage resources and deny another host that same access. Access control lists provide a basic level of security for accessing the storage resources.

Another conventional approach implements authenticating the identity of a new host with a Public Key Infrastructures (PKI) mechanism. Such an approach prevents an unauthorized intruder host from attaching to the fabric via any port. Such an approach has the disadvantage of requiring the explicit definition of the ability of the host to log into the host port.

Another conventional approach implements Logical Unit Number (LUN) masking which makes a LUN available to some hosts and unavailable to other hosts. Servers can attempt to write volume labels to all available LUNs. This can render the LUNs unusable by other operating systems and can result in data loss.

Another conventional approach implements assigning a unique ID to the host. Persistent binding is a host-centric enforced way of directing an operating system to assign certain Small Computer System Interface (SCSI) target IDs and LUNs. For example, a specific host will generally assign an SCSI target ID to the first router found and assign LUNs to three tape drives attached to the router. Operating systems and upper-level applications (i.e., backup software) typically require a static or predictable SCSI target ID for their storage reliability.

Another conventional approach implements an encryption engine to scramble and descramble the data and a key manager (hardware appliance or software) to create, manage, and store the encryption keys. The encryption engine has a unique public/private key pair for each device connected to the key manager. Another conventional approach implements parameter of restriction for remote access mechanism such as telnet, HTTP, and API.

However, the conventional approaches mentioned above have drawbacks. Conventional approaches can allow inappropriate privileges to change data, such as editing, deleting, corrupting, or otherwise modifying sensitive data on a just a bunch of drives (JBOD) storage system, disk array, or other storage devices.

Conventional approaches can also allow inappropriate use of resources for an organization, such as removing or impairing access to a resources with a Denial of Service (DOS) attack and using a compromised dual-homed host with a Host Bus Adapter (HBA) to access SAN resources and read, store, or distribute illegal files. Conventional approaches can also allow inappropriate access to view data, such as viewing confidential email or sensitive data files. If a LUN is masked by a host, then the LUN cannot be employed in case of a clustered environment since the LUN is shared by cluster nodes. In such a case, the LUN mechanism is modified.

It would be desirable to implement a method to provide chip based security for I/O packets in an array using dynamic topology.

SUMMARY OF THE INVENTION

The present invention concerns an apparatus comprising a controller circuit and an array. The controller circuit may be configured to read/write data in response to one or more input/output requests. The array may be configured to present/receive data to/from the controller circuit in response to the input/output requests. The data may be only transmitted to/from the array after a successful authentication between (i) a first code embedded within each of the input/output requests and (ii) a second code stored on a non-volatile memory within the controller circuit.

The objects, features and advantages of the present invention include providing a chip based security for I/O packet in an array using dynamic topology that may (i) protect unauthorized access to I/O packets arriving at the host port by encrypting I/O packets using dynamic secret keys, (ii) block a second I/O packet from an intruder if the intruder obtains access to the first I/O packet, (iii) provide an irreversible, dynamic secret key (e.g., an intruder cannot obtain access to an older I/O packet using a current secret key), (iv) provide security to host ports at the command level, (v) convert the entered secret key into a different representation and/or store information onto a non-volatile chip, (vi) prevent any proxy server from accessing RAID arrays, (vii) provide an extra security mechanism where a user may be prompted to enter a private key or security key to proceed, (viii) access the private key and/or secret key on the non-volatile chip during disaster recovery, (ix) identify altered HBAs, notify an administrator and/or deny a user login, (x) prevent node name and/or port name spoofing at port login time, (xi) prevent source port ID spoofing, (xii) prevent denial of service attacks that change the privileges of other users, (xiii) provide a dedicated security mechanism to reduce firmware overhead, (xiv) limit intrusion and/or hacking of data stored in a storage array, (xv) provide secure communication between a host and storage controllers and/or (xvi) be implemented in a cost effective manner.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention may address concerns about mission critical business applications that have spurred growth in various facets of storage area network (e.g., SAN) technology. The need for enhanced security in these solutions is growing. In a SAN, the various arrays are managed using a management station, which may be invoked by any host present in the network with the management software installed. With many hosts connected to common networks where arrays are connected, there is a need to secure the arrays from unauthorized access to various sections of individual data. The present invention may provide a security mechanism on a chip involving key generation and/or key comparison. The security may allow a particular use to access data previously written, but deny access to another user who may not be authorized. A timeout parameter may enable secure logging for sensitive data stored. Such an implementation may be useful in organizations that outsource IT management. Such organizations may have confidence that data assets are secure from unauthorized access. The present invention may allow only an authorized person (or user) to access particular data from the array.

Figure 1:
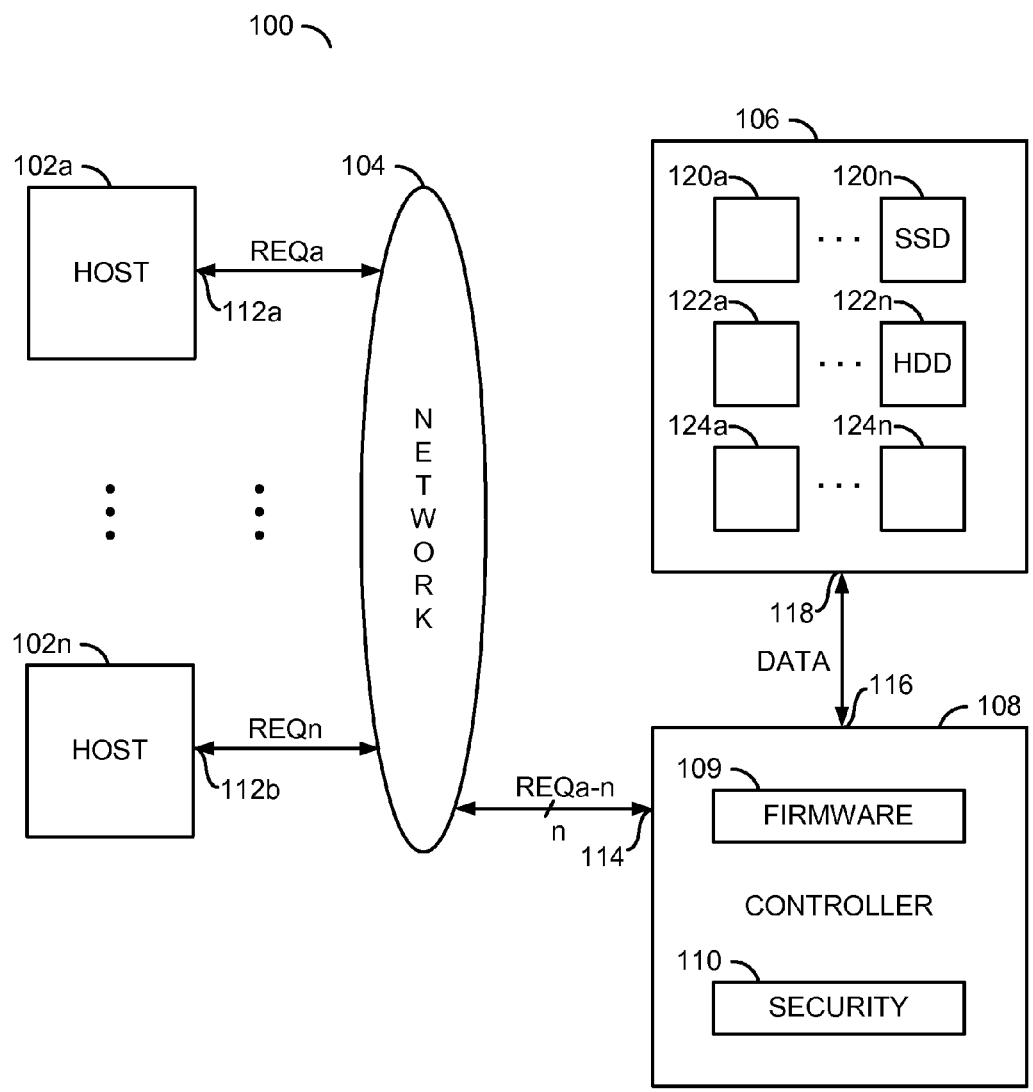
FIG. 1 is a diagram of an overview of the present invention.

Referring to FIG. 1, a block diagram of a system 100 is shown illustrating a context of the present invention. The system 100 generally comprises a plurality of blocks (or circuits) 102a-n, a network 104, a block (or circuit) 106 and a block (or circuit) 108. The circuit 102 may be implemented as a host. The host 102 may be implemented as one or more computers in a host/client configuration. The circuit 106 may be implemented as a number of storage devices (e.g., a drive array or one or more drive trays). The circuit 106 may include a number of the same and/or different drive types. The circuit 108 may be implemented as a controller. In one example, the circuit 108 may be implemented as a redundant array of inexpensive drives (e.g., RAID) controller. The circuit 108 may include a block (or module) 109 and a block (or module, or circuit) 110. The module 109 may be implemented as firmware. The circuit 110 may be implemented as a security circuit. The circuit 110 may be implemented in hardware, software, or a combination of hardware and/or software.

The host 102a may have an input/output 112a that may present an input/output request (e.g., REQa). The signal REQa may be sent through the network 104 to an input/output 114 of the controller 108. The controller 108 may have an input/output 116 that may present a signal (e.g., DATA) to an input/output 118 of the storage array 106. The hosts 120b-n may present similar signals (e.g., REQb-n).

The storage array 106 may have a number of storage devices (e.g., drives or volumes) 120a-120n, a number of storage devices (e.g., drives or volumes) 122a-122n and a number of storage devices (e.g., drives or volumes) 124a-124n. In one example, each of the storage devices 120a-120n, 122a-122n, and 124a-124n may be implemented as a single drive, multiple drives, and/or one or more drive enclosures. The storage devices 120a-120n, 122a-122n and/or 124a-124n may be implemented as one or more hard disc drives (e.g., HDDs), one or more solid state devices (e.g., SSDs) or a combination of HDDs and SSDs.

The security circuit 110 may be implemented to provide security for accessing particular portions of the RAID array 106. The security may be implemented on a per user basis. The circuit 110 may implement a certificate based authorization/authentication mechanism. In one example, the security circuit 110 may be implemented as a non-volatile chip. A first (or secret) key (or code) and a second (or private) key (or code) may be provided by the circuit 110 when data is first written to the array 106. Such keys may be used by a SAN administrator. The private key is normally preserved by the administrator for future use. In case of the disaster recovery, the private key may be persistent and may be recovered from the circuit 110. If a user from one of the hosts 102a-n logs onto the SAN/NAS array 106 for the first time, the user will be asked to provide a name for a secret key. Using the secret key entered by the user, a private key will be generated by the chip. The private key will be displayed for the user to read and/or otherwise keep tack of. The secret key may be as simple as an E-Mail ID of the user. However, the particular format of the secret key may be varied to meet the design criteria of a particular implementation. The information entered will then pass through a certificate authentication process. The certificate process may be local to the customer and/or may make use of any trusted third party certified authority. The credentials entered may be protected at the application level by the certificate system.

The information about the private key entered may be stored in the circuit 110 for the future use. A user may be asked to remember the private key for future access to the array 106. Each time the user logs in to the array 106, the user normally needs to enter the private key. Without the private key, a user will normally be denied access to the previously stored data on the array 106. If the user forgets the private key, then user may be asked to enter the secret key. A user may obtain a new secret key with the private key. In one example, a user may need to obtain permission from an administrator prior to obtaining a new secret key.

The circuit 100 may provide an enhanced security mechanism to prevent the unauthorized access to the array 106. In one example, the circuit 110 may store the information in the form of a table. An example of such a table may include one or more of the secret key, the private key, an OS ID, etc., as shown in the following table:

TABLE 1

| Secret Key | Private Key | OS ID |
|---|---|---|
| $K_{secret}$ | $K_{private}$ | $OS\ ID_x$ |
| ... | ... | $OS\ ID_y$ |
| ... | ... | ... |

To ensure that the credentials entered by a particular user go through a proper and/or trusted channel, a trusted certificate authority (or authentication) system (or process) may be implemented. The authentication may be a customer centric and/or may be a trusted third party certificate authority system. A second level security mechanism incorporated to protect the spoofing mechanism. The certificate authority may distribute incorrect credentials to the circuit 110 in an attempt to access the array 106. To prevent such an attempt, the credentials entered are normally converted to a private key using a secret key to private key mechanism.

The security circuit 110 may implement a secret key to private key conversion mechanism. The third party certificate authority system may distribute a false secret key improperly claiming to be an authenticated user. To protect the array 106 from such scenarios, the secret key entered by the user is converted to the private key. The secret key and/or the private key are normally co-related. Using a suitable mathematical function, the secret key chosen by a user may be converted to the private key. This combination of secret to private keys is normally stored persistently in the circuit 110. In one example, the mathematical function may be exclusive-OR. In another example, a periodic function may be implemented. In another example, a modulus operation may be implemented. The particular function implemented may be varied to meet the design criteria of a particular implementation.

In one example, the keys may be reversible in nature. For example, the private key may be used to obtain the secret key, and vice versa. The circuit 110 may store the information in the form of a table. If the user forgets the secret key, then user will be prompted to provide the private key information, and vice versa as shown in the following table:

TABLE 2

| Secret Key | Private Key = Function (Secret Key, Secret Key$_{admin}$) |
|---|---|
| $K_{secret}$ | $K_{private}$ |
| ... | ... |
| ... | ... |

When an incoming I/O packet (or request) arrives, the packet will be encrypted by a dynamic secret key generated by making use of the OS ID and/or Private Key. In one example, the private key and/or OS ID will normally be obtained using the circuit 110 as follows:

Dynamic Secret Key=Function (OS ID, Private Key)

Secure IO Packet=Encrypt Function (Dynamic Secret Key, Actual IO)

Since the Dynamic Secret Key is dynamic (e.g., changes), the probability of hacking a particular I/O packet by an intruder is almost zero. The key of an older I/O packet may be hidden, even if the user knows the current dynamic secret key. Such an implementation may prevent an intruder from improperly obtaining access to the older I/O packet.

At the receiver end, Actual I/O Packet=Decrypt Function (Secure I/O Packet, OSID, Private Key). A suitable mathematical operation may be made for encryption and/or decryption. For example, an exclusive operation for encrypting the I/O packet and decrypting the I/O packet may be implemented.

The following table may be implemented in the security circuit 110 to reflect the relation between the I/O packet and the dynamic secret key:

TABLE 3

| Actual IO | Dynamic Secret Key | Secure IO Packet |
|---|---|---|
| $IO_x$ | $S_{d1}$ | $Sec_{IO1}$ |
| ... | ... | ... |

If a new user logs into the array 106, the new user will normally be asked for the secret key. A private key will normally be generated by making use of this secret key. A user will normally be prompted to remember the private key generated and re-enter the private key. Once implemented, a user will normally be granted the access to the SAN/NAS components in the array 106.

If a user logs in from one of the hosts 102a-n already registered into the TABLE 2, then the user will normally be prompted for the private key from the information table or from the circuit 110. If the user does not remember the private key, then the user will be asked for the secret key. If the user remembers the secret key, then the private key will be generated again and replace the old private key.

If the host entry is already registered into the circuit 110, and the user does not remember the secret key or the private key, then the user will be asked to choose a new secret key and a new private key will be generated. Events may be logged and notification will normally be sent to the SAN administrator.

If the user is an administrator, then the circuit 110 will normally be notified if the private key entered by the user matches with that of the private key present in the circuit 110 information table. The event will normally be logged and notification will be sent to the administrator. If the user is already logged in to the circuit 110, but then attempts to log in from a different one of the hosts 102a-n (e.g., as detected by a host bus adapter), the circuit 110 normally identifies the changed WWN and notifies the SAN admin regarding the same.

An administrator may determine a timeout period. A user should enter the private key within the fixed timeout period. Whenever the timeout period is exceeded, the SAN administrator will normally be notified. The timeout may be based on a particular customer specification. If the user fails to login within the timeout period, the private key corresponding to the user for that host entry will normally be removed. The user may then re-enter the secret key and obtain a new private key, thus providing an enhanced security mechanism.

A process may be implemented for the key generation and/or key comparison within the timeout period. In one example, a user may be classified as an administrator, a new user, or a returning user. If the user is an administrator, the user may be asked to enter the administrator private key. The security circuit 110 may compare the administrator private key entered by the user to the correct private key of the administrator. If the key entered by the user matches the private key of the administrator, then the user may be successfully logged in.

If the user is a new user, the user may be asked to enter the user public key. The security circuit 110 may then generate the private key. The user may be reminded to remember the private key. The user may then be asked for an IP address of the array 106 and/or a domain name. If new user logs in from same host but from a different HBA, then the SAN administrator may be notified. The user may be asked to enter the user public key. The security circuit 110 may then generate the private key. Next, the user may enter the private key. The user may then be asked for the IP address of the array 106 and/or a domain name.

If a user is an already existing user and the user has administrative privileges, the user may be asked to enter the private key. The security circuit 110 may then compare the private key entered by the returning user to the existing private key of the already logged in user. If the private key entered by the returning user matches the existing private key, then the user may be asked for the IP address of the array 106 and/or a domain name.

If a user is a returning user and the user does not have administrative privileges, the returning user may be asked to enter the private key. The security circuit 110 may then compare the private key entered by the returning user to the existing private key. If the private key entered by the returning user matches the existing private key, then the user may be asked for the IP address of the array 106 and/or a domain name.

In one example, the security circuit 110 may be implemented as a non-volatile chip. The security circuit 110 may be installed onto the RAID controller 108. Software on the security circuit 110 may incorporate a trusted certificate authentication (e.g., TCA) mechanism. This may be a customer specific, or may be a trusted third party provided system. Code supporting the chip hardware integration may be implemented in the RAID controller circuit 108. Code may persistently store the parameters onto the circuit 110, such as the Secret Key, Private Keys, and/or OS ID. Code to support the Dynamic Key Generation, Compare, and/or Secure Key to Private Key conversion mechanism may be stored in the firmware 109. Code to log the events related to the security mechanisms provided may be stored in the circuit 110.

Figure 2:
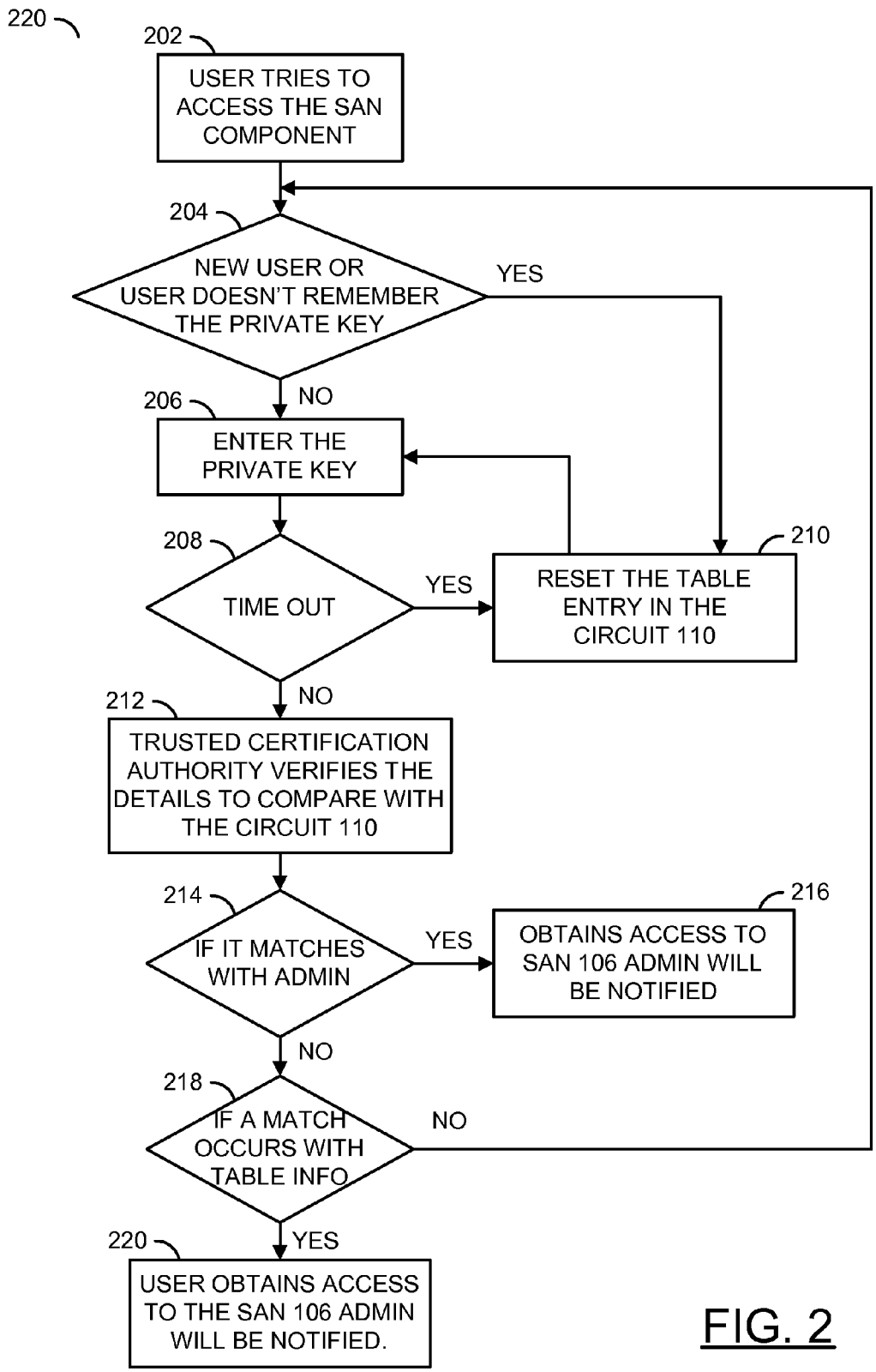
FIG. 2 is a flow diagram of the present invention.

Referring to FIG. 2, a flow diagram of a process (or method) 200 for entering the SAN is shown. The process 200 generally comprises a step (or state) 202, a decision step (or state) 204, a step (or state) 206, a step (or state) 208, a step (or state) 210, a step (or state) 212, a decision step (or state) 214, a step (or state) 216, a decision step (or state) 218 and a step (or state) 220. The method 200 may be implemented in the security circuit 110. In the state 202, a user may try to access the array 106. A state 204 may determine if a user is a new user or if the user does not remember the private key. If so, the method 200 moves to the state 210. If not, the method 200 moves to the state 206. In the step 206, the user may enter the private key. Next, in the state 208, the method 200 may determine whether a time out has occurred. If so, the method 200 moves to the state 210. If not, the method 200 moves to the state 212. In the state 210, the method 200 may reset the table entry in the circuit 110. Next, the method 200 moves to the state 212. In the state 212, the method 200 may perform trusted certification of authority and verify the details to compare with the circuit 110.

Next, the method 200 moves to the state 214. The state 214 may determine if a match has occurred with the administrator. If so, the method 200 moves to the state 216. If not, the method 200 moves to the state 218. In the state 216, the user may obtain access to the SAN 106 and the administrator may be notified. State 218 may determine if a match occurs using information stored in the table. If not, the method 200 moves back to the state 204. If so, the method 200 moves to the state 220. In the state 220, a user may obtain access to the SAN 106 and the administrator may be notified.

Figure 3:
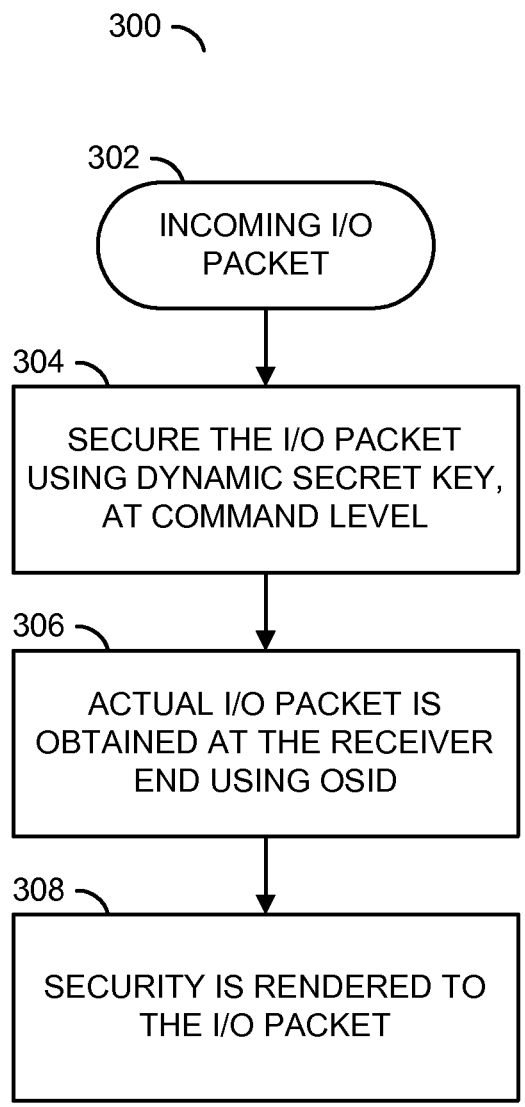
FIG. 3 is a flow diagram of the present invention.

Referring to FIG. 3, a flow diagram of a process (or method) 300 for securing the I/O packets is shown. The process 300 generally comprises a step (or state) 302, a step (or state) 304, a step (or state) 306 and a step (or state) 308. The method 300 may be implemented in the security circuit 110. The state 302 may receive an incoming I/O packet. The state 302 may secure the I/O packet using a dynamic secret key at the command level. The secret key may be obtained in the state 216 in the method 200. The state 306 may obtain the actual I/O packet at the receiver end using OSID. Further I/O packets may not be obtained if the intruder knows the older keys, as the keys are dynamic in nature. The step 308 may render the security to the I/O packet.

The functions performed by the diagrams of FIGS. 2 and 3 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:
1. An apparatus comprising:
   a controller circuit configured to read or write a plurality of data packets in response to one or more input/output requests; and
   an array configured to present or receive said plurality of data packets to or from said controller circuit in response to said input/output requests, wherein (A) each of said plurality of data packets are only transmitted to or from said array after a successful authentication between (i) a first code that dynamically changes between transmission of each of said data packets embedded within each of said plurality of packets and (ii) a second code stored on a non-volatile memory within said controller circuit, (B) said first code is verified after each of said plurality of packets is received, (C) said first code is generated during an initial access to said array by a particular user, and (D) said first code of said particular user allows said particular user to access only portions of said array with data previously written by said particular user.

2. The apparatus according to claim 1, wherein said first code comprises a private key and said second code comprises a comparison key.

3. The apparatus according to claim 2, wherein said comparison key is stored in a table in said non-volatile memory.

4. The apparatus according to claim 3, wherein said comparison key stored in said table is compared to said private key to provide said successful authentication.

5. The apparatus according to claim 1, wherein said authentication is denied after a predetermined time.

6. The apparatus according to claim 1, wherein said authentication is performed for each of said plurality of packets.

7. The apparatus according to claim 1, wherein said first code is preserved by an administrator for future use.

8. The apparatus according to claim 1, wherein said second code is compared to the first code using an exclusive-OR mathematical function.

9. The apparatus according to claim 1, wherein said first code is used to obtain said second code.

10. The apparatus according to claim 1, wherein said authentication of each of said data packets implements an encryption to provide secure communication between said controller circuit and said array.

11. A method for providing security on data stored on a network, comprising the steps of:
   reading or writing a plurality of data packets in response to one or more input/output requests; and
   presenting or receiving said plurality of data packets to or from a controller circuit in response to said input/output requests, wherein (A) each of said plurality of data packets are only transmitted to or from an array after a successful authentication between (i) a first code that dynamically changes between transmission of each of said data packets embedded within each of said plurality of packets and (ii) a second code stored on a non-volatile memory within said controller circuit, (B) said first code is verified after each of said plurality of packets is received, (C) said first code is generated during an initial access to said array by a particular user, and (D) said first code of said particular user allows said particular user to access only portions of said array with data previously written by said particular user.

12. The method according to claim 11, further comprising the steps of:
   determining whether a predetermined time period has occurred; and
   denying access to said data after said predetermined time period.

13. The method according to claim 11, further comprising the step of:
   determining said successful authentication by comparing said first code with said second code.

14. The method according to claim 11, wherein said first code comprises a private key and said second code comprises a compare key stored in a table on the controller.

15. The method according to claim 11, further comprising:
   generating a new second code in response to a third code.

16. The method according to claim 15, wherein said third code comprises a secret key.

17. An apparatus comprising:
   means for reading or writing a plurality of data packets in response to one or more input/output requests; and
   means for presenting or receiving said plurality of data packets to or from a controller circuit in response to said input/output requests, wherein (A) each of said plurality of data packets are only transmitted to or from an array after a successful authentication between (i) a first code that dynamically changes between transmission of each of said data packets embedded within each of said plurality of packets and (ii) a second code stored on a non-volatile memory within said controller circuit, (B) said first code is verified after each of said plurality of packets is received, (C) said first code is generated during an initial access to said array by a particular user, and (D) said first code of said particular user allows said particular user to access only portions of said array with data previously written by said particular user.

* * * * *